United States Patent
Murayama et al.

(10) Patent No.: US 8,016,723 B2
(45) Date of Patent: Sep. 13, 2011

(54) VEHICLE ENGINE CONTROL APPARATUS

(75) Inventors: Masami Murayama, Yokohama (JP); Masahiro Iriyama, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 734 days.

(21) Appl. No.: 12/124,269

(22) Filed: May 21, 2008

(65) Prior Publication Data

US 2008/0312035 A1 Dec. 18, 2008

(30) Foreign Application Priority Data

Jun. 13, 2007 (JP) ................................. 2007-156779

(51) Int. Cl.
*B60W 10/04* (2006.01)
*B60W 10/10* (2006.01)
*G06F 7/00* (2006.01)
*G06F 17/00* (2006.01)
*G06F 19/00* (2006.01)

(52) U.S. Cl. ........................... 477/110; 477/111; 701/54

(58) Field of Classification Search .................. 477/110, 477/111; 701/54
See application file for complete search history.

(56) References Cited

U.S. PATENT DOCUMENTS

| | | | |
|---|---|---|---|
| 3,272,028 A * | 9/1966 | Randol ............................ | 477/85 |
| 4,787,044 A * | 11/1988 | Nagata et al. ................. | 701/110 |
| 5,568,387 A * | 10/1996 | Andersson ..................... | 701/51 |
| 5,569,115 A | 10/1996 | Desautels et al. | |
| 5,582,558 A * | 12/1996 | Palmeri et al. ................ | 477/109 |
| 5,863,275 A | 1/1999 | Nozaki et al. | |
| 5,993,355 A * | 11/1999 | Nordgård ...................... | 477/174 |
| 6,126,569 A * | 10/2000 | Genise ............................ | 477/91 |
| 6,461,272 B1 * | 10/2002 | Boardman et al. .............. | 477/91 |
| 7,468,018 B2 * | 12/2008 | Radich ............................ | 477/78 |

FOREIGN PATENT DOCUMENTS

| | | |
|---|---|---|
| DE | 102 60 011 A1 | 7/2004 |
| JP | 10-47100 A | 2/1998 |
| JP | 2001-74135 A | 3/2001 |
| JP | 2005-042872 A | 2/2005 |
| JP | 2006-57466 A | 3/2006 |
| JP | 2006-233851 A | 9/2006 |
| JP | 2006-307768 A | 11/2006 |
| JP | 2007-32381 A | 2/2007 |

OTHER PUBLICATIONS

An English translation of the Japanese Office Action of corresponding Japanese Application No. 2007-156779, dated Oct. 19, 2010.
The extended European Search Report of corresponding European Application No. 08158124.1-1254, dated Dec. 2, 2010.

* cited by examiner

*Primary Examiner* — Tisha Lewis
(74) *Attorney, Agent, or Firm* — Global IP Counselors, LLP (57) ABSTRACT

A vehicle engine control apparatus provides rotational speed synchronization control during a shift operation. A shift operation detecting component detects a shift position resulting from a manual shift operation of a manual transmission connected to an engine. A vehicle speed detecting component detects a vehicle speed. The computing component computes an input side transmission rotational speed value based on the vehicle speed and a gear ratio. A driving intent determining component determines a driver's driving intention. A rotational speed synchronization control component performs rotational speed synchronization based on a first target engine rotational speed value that is smaller than the input side transmission rotational speed value when a clutch is disconnected and a deceleration intention exists by the driver, and based on a second target engine rotational speed value that is equal to the input side transmission rotational speed value when the clutch is disconnected without the deceleration intention.

17 Claims, 7 Drawing Sheets

VEHICLE ENGINE CONTROL APPARATUS

CROSS-REFERENCE TO RELATED APPLICATIONS

This application claims priority to Japanese Patent Application No 2007-156779, filed on Jun. 13, 2007. The entire disclosure of Japanese Patent Application No. 2007-156779 is hereby incorporated herein by reference.

BACKGROUND OF THE INVENTION

1. Field of the Invention

The present invention generally relates to an engine control apparatus for a manual transmission vehicle having a manual transmission that connects to an output side of an engine through a clutch.

2. Background Information

There is conventional technology that exists for suppressing a physical shock (shift shock) that can occur when a transmission of a vehicle shifts to a different gear. The technology suppresses the shift shock by executing a rotational speed synchronization control that controls the rotational speed of the engine to a target rotational speed using feedback control. The target engine rotational speed is set to a rotational speed value required for the vehicle to travel in the target gear position that will be in effect after the shift operation is completed.

One example of conventional technology for an automatic transmission vehicle equipped with an automatic transmission having a manual mode in which a driver can shift gears is disclosed in Japanese Laid-Open Patent Publication No. 2005-42872 discloses. In this conventional technology when a driver downshifts with the intention of decelerating, the rotational speed synchronization control described above is stopped in order to ensure that the driver experiences a feeling of deceleration.

SUMMARY OF THE INVENTION

It has been discovered that with a manual transmission vehicle, since the driver manually operates the transmission, unexpected shock will sometimes occur if the rotational speed synchronization control is stopped in order to obtain a feeling of deceleration under the same circumstances.

The present invention was conceived in view of this issue of shift shock regarding manual transmission vehicles. One object of object is to provide a vehicle engine control apparatus that increases a feeling of deceleration while suppressing shift shock in a manual transmission vehicle by executing a rotational speed synchronization control that is appropriate for a circumstance in which the driver intends to decelerate.

In order to achieve the object, a vehicle engine control apparatus is provided for a vehicle equipped with a manual transmission. The vehicle engine control apparatus basically comprises a shift operation detecting component, a vehicle speed detecting component, a transmission input side rotational speed computing component, a driving intent determining component and a rotational speed synchronization control component. The shift operation detecting component is configured to detect a shift position resulting from a manual shift operation of a manual transmission connected to an engine. The vehicle speed detecting component is configured to detect a vehicle speed. The transmission input side rotational speed computing component is configured to compute an input side transmission rotational speed value based on the vehicle speed detected by the vehicle speed detecting component and a gear ratio determined based on the shift position detected by the shift operation detecting component. The driving intent determining component is configured to determine a driver's driving intention. The rotational speed synchronization control component is configured to perform rotational speed synchronization control by controlling an engine rotational speed towards a target engine rotational speed based on a first target engine rotational speed value that is equal to the input side transmission rotational speed value when a clutch is disconnected when the driving intent determining component determining that the driver's driving intention indicates a deceleration intention, and based on a second target engine rotational speed value that is smaller than the input side transmission rotational speed value when the clutch is disconnected without the deceleration intention.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
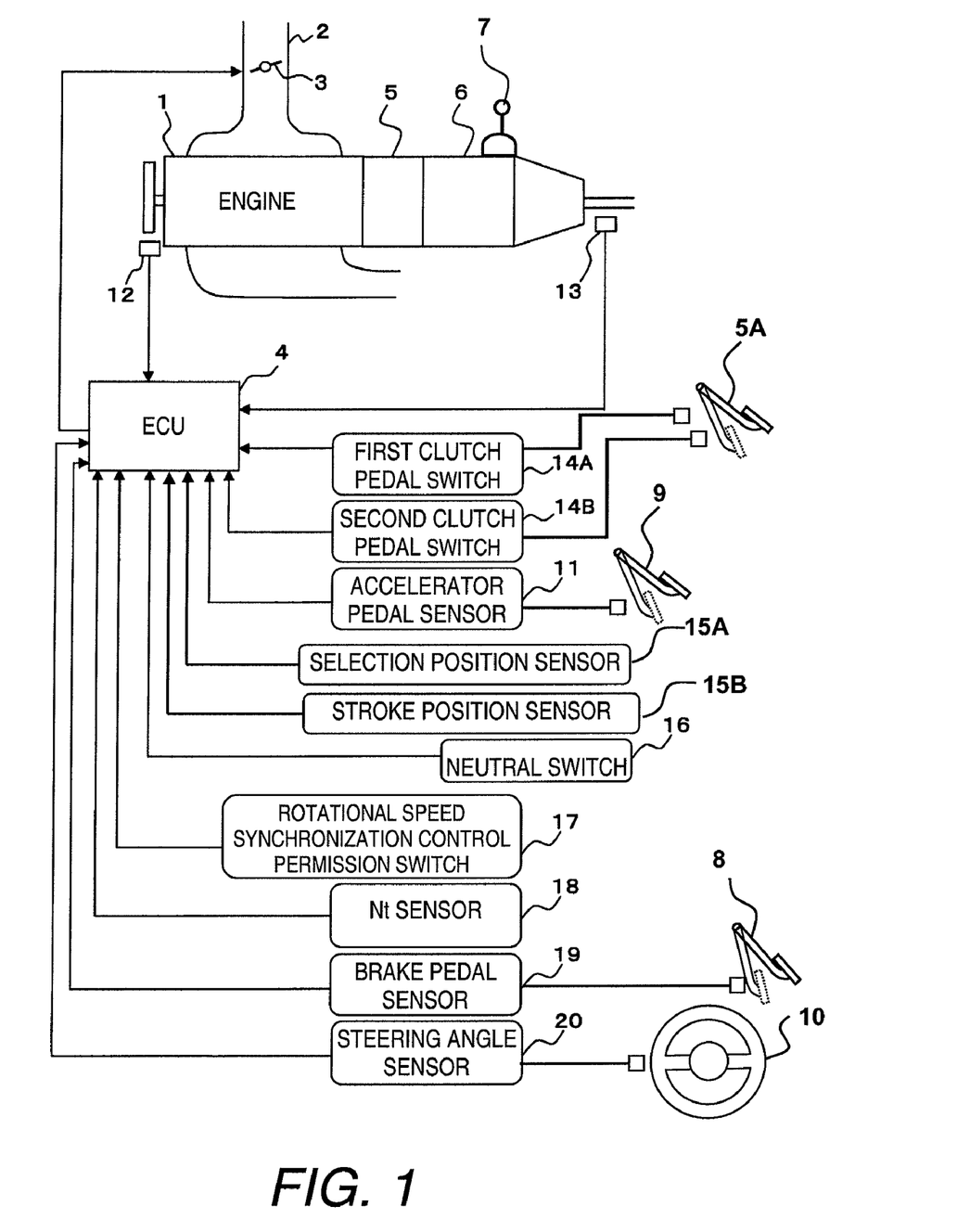
FIG. 1 is a system diagram for a manual transmission vehicle equipped with an engine control apparatus in accordance with one illustrated embodiment.

Referring initially to FIG. 1, a manual transmission is illustrated for a vehicle equipped with a vehicle engine control apparatus in accordance with a first embodiment. An internal combustion engine 1 of the vehicle has an intake passage 2 with an electronically controlled throttle valve 3 arranged to control the amount of intake air drawn into the intake passage 2 of the engine 1. The opening degree of the throttle valve 3 is controlled by an engine control unit (ECU) 4. The amount of fuel supplied to the engine 1 is controlled by the engine control unit 4 such that a prescribed air fuel ratio is obtained with respect to the intake air amount. The fuel supply system of the engine 1 is not shown in the drawings and an explanation thereof will not be provided.

A manual transmission 6 arranged to connect to the output side of the engine 1 through a clutch 5. The clutch 5 is operated by the driver with a clutch pedal 5A. The clutch 5 is connected when the clutch pedal is released and disconnected when the clutch is depressed. The manual transmission 6 is configured such that a gear position thereof is changed by a driver operating a shift lever (shift knob) 7. The vehicle also has other conventional components including, but not limited to, a brake pedal 8, an accelerator pedal 9 and a steering system 10.

The engine control unit 4 preferably includes a microcomputer with an engine rotational speed synchronization control program that serves to match the rotational speed of the engine 1 of such a vehicle to an input rotational speed of the manual transmission 6 when a driver operates the clutch pedal 5A so as to disconnect the clutch 5 in order to change the gear position of the manual transmission 6. In particular, the microcomputer of the engine control unit 4 is programmed to control the intake air quantity and ignition timing of the engine 1 such that the engine rotational speed is matched to the input rotational speed of the manual transmission 6. The transmission input rotational speed, to which the engine rotational speed is adjusted, is determined based on the vehicle speed and the gear ratio that will result after the shift operation is completed (post-shift gear ratio). The engine control unit 4 also includes other conventional components such as an input interface circuit, an output interface circuit, and storage devices such as a ROM (Read Only Memory) device and a RAM (Random Access Memory) device. The internal RAM of the engine control unit 4 stores statuses of operational flags and various control data. The internal ROM of the engine control unit 4 stores the control programs for various operations. It will be apparent to those skilled in the art from this disclosure that the precise structure and algorithms for the engine control unit 4 can be any combination of hardware and software that will carry out the functions of the present invention. Basically, the engine control unit 4 constitutes a main part (i.e., a rotational speed synchronization control component) of the engine control apparatus of the illustrated embodiment.

With the vehicle engine control apparatus of the illustrated embodiment, as explained below in more detail, when a rotational speed synchronization control is to be executed during gear shifting and the driver intends to decelerate, the feeling of deceleration can be increased while suppressing shift shock by executing the rotational speed synchronization control using a target rotational speed that is appropriate according to the driver's intent.

The vehicle is equipped with a variety of sensors, which produce signals. The engine control unit 4 receives these signals from the sensors to executing the rotational speed synchronization control. In particular, an accelerator pedal sensor 11 is configured and arranged to detect a depression amount (accelerator position) APO of the accelerator pedal 9 and outputs a corresponding signal to the engine control unit 4. The accelerator pedal sensor 11 constitutes one example of a driving intent determining component configured to determine a driver's driving intention for the illustrated embodiment. A crank angle sensor 12 is configured and arranged to detect rotation of a crankshaft of the engine 1 and output a signal that is synchronized to the rotation of the crankshaft of the engine 1 to the engine control unit 4. The engine rotational speed NE can be detected based on this signal from the crank angle sensor 12. A vehicle speed sensor 13 is configured and arranged to detect an output shaft rotational speed of the transmission 6 (a vehicle speed VSP) and outputs a corresponding signal to the engine control unit 4. The vehicle speed sensor 13 constitutes one example of a vehicle speed detecting component for the illustrated embodiment.

Figure 2:
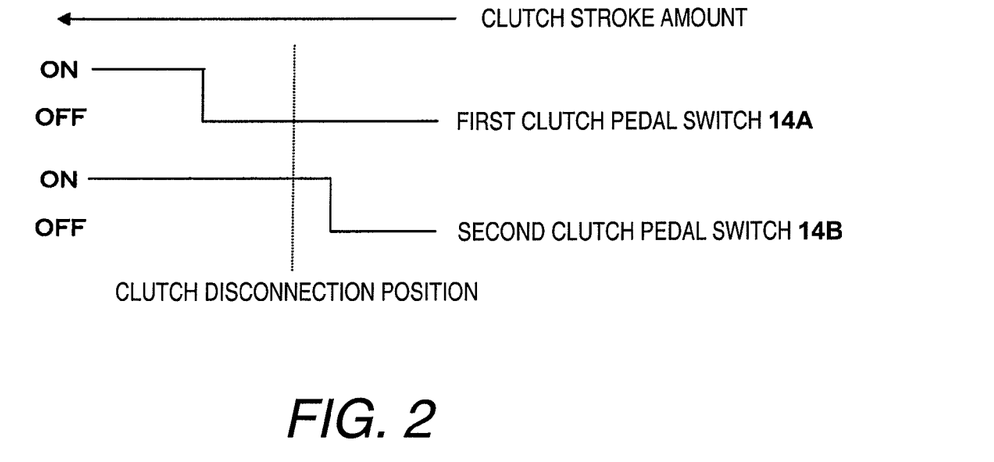
FIG. 2 illustrates the operation of the clutch sensors used in the illustrated embodiment.

The vehicle is equipped with two clutch pedal switches 14A and 14B are configured and arranged to issue ON-OFF signals in accordance with the position of the clutch pedal 5A. As shown in FIG. 2, the first clutch pedal switch 14A is configured to turn from OFF to ON after the clutch as been fully released, while the second clutch pedal switch 14B is configured to turn from OFF to ON in response to an increase in a stroke amount of the clutch pedal 5A at a point occurring before the clutch 5 becomes fully released from a connected state. As a result, the clutch pedal switch 14A can accurately detect when the clutch 5 is released and the clutch pedal switch 14B can detect that the driver is operating the clutch 5 before the clutch 5 reaches a released state. With this embodiment, the clutch operation can be detected accurately and inexpensively using ON-OFF switches. However, it is also acceptable to use a sensor that provides a linear output based on the clutch operation amount. The clutch pedal switches 14A and 14B constitute clutch pedal sensors, and are examples of a clutch depression amount detecting component for the illustrated embodiment.

Two shift position sensors 15A and 15B are configured and arranged to issue signals corresponding to the position of the shift lever (shift knob) 7. More specifically, the selection position sensor 15A is configured to detect a position of the shift lever 7 in the X direction shown in FIG. 3 (selection direction) and to issue a signal corresponding to the position of the shift lever to the engine control unit 4. The stroke position sensor 15B is configured to detect a position of the shift lever 7 in the Y direction shown in FIG. 3 (stroke direction) and to issue a signal corresponding to the shift lever position to the engine control unit 4. The gear position can be identified (i.e., the target gear position can be identified during shifting and a confirmation that the gear is engaged can be obtained after shifting) based on the signals indicating the position of the shift lever 7 in the two directions. The selection position sensor 15A and the stroke position sensor 15B constitute one example of a shift operation detecting component for the illustrated embodiment. Also the selection position sensor 15A and the stroke position sensor 15B constitute one example of a gear position detecting component for the illustrated embodiment.

Figure 3:
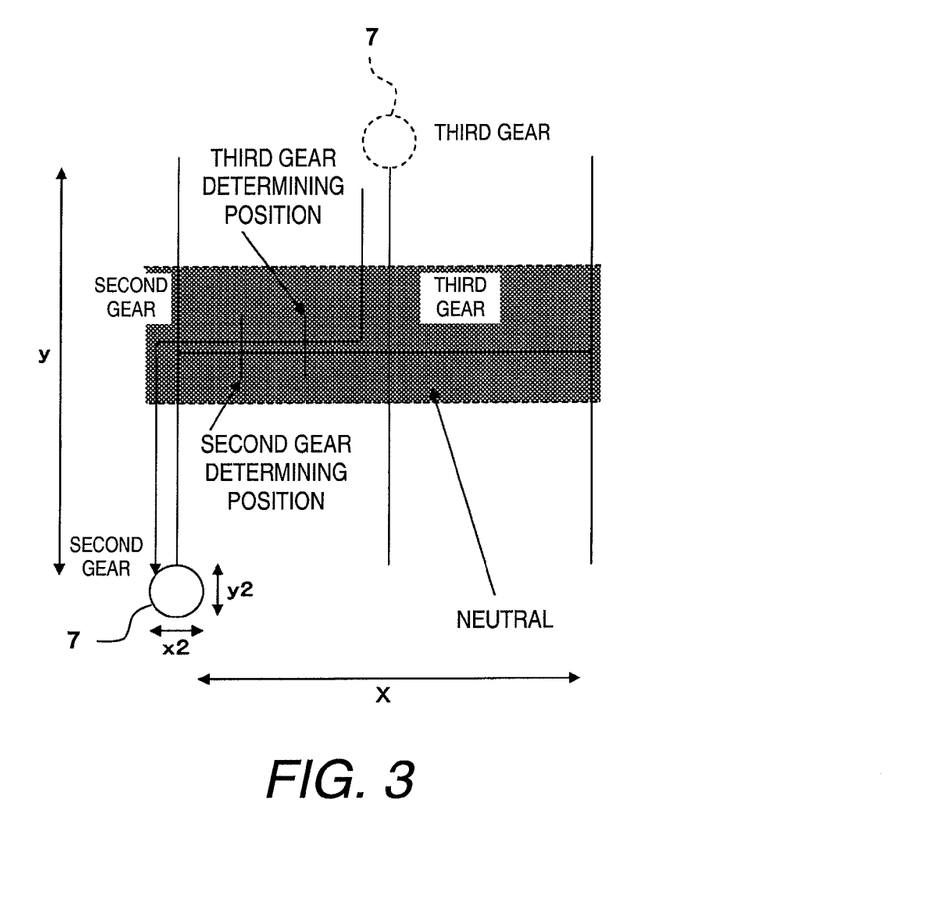
FIG. 3 illustrates the output of the shift position sensors.

A neutral switch 16 is configured to turn ON when the shift lever 7 is in a neutral region (the darkly shaded region shown in FIG. 3). The neutral switch 16 issues a signal corresponding to the neutral position of the shift lever 7 to the engine control unit 4 when the neutral switch 16 is turned ON. The select neutral switch 16 constitutes part of the shift operation detecting component for the illustrated embodiment.

A rotational speed synchronization permission switch 17 is provided on or near the driver's seat to enable the driver to permit or prohibit execution of the rotational speed synchronization control during gear shifting. The rotational speed synchronization permission switch 17 issues an ON (permit)—OFF (prohibit) signal to the engine control unit 4. It is also acceptable to simply omit the rotational speed synchronization control permission switch 17 such that rotational speed synchronization control is always executed.

An Nt sensor 18 is provided to detect the input shaft rotational speed Nt of the transmission 6 and configured to issue an Nt signal to the engine control unit 4. The Nt sensor 18 constitutes a transmission input side rotational speed detecting component.

A brake pedal sensor 19 is configured to detect a depression amount of the brake pedal 8 and a steering angle sensor 20 is configured to detect a steering angle of the steering system 10.

The signals from the brake pedal sensor 19 and the steering angle sensor 20 are also fed to the engine control unit 4. The brake pedal sensor 19 constitutes a brake operation detecting component, while the steering angle sensor 20 constitutes a steering angle detecting component.

The engine control unit 4 determines a driver requested torque based on the accelerator position APO (and the engine rotational speed Ne). Normally, (when gear shifting is not occurring), the engine control unit 4 then sets the driver requested torque as a target engine torque tTe (target engine torque tTe=drive requested torque). The engine control unit 4 then calculates a target throttle opening tTVO required to obtain the driver requested torque based on the target engine torque tTe and the engine rotational speed Ne and controls the opening degree of the electronically controlled throttle valve 3 in accordance with the target throttle valve opening tTVO.

Conversely, during gear shifting, if the rotational speed synchronization control permission switch 17 is ON, then the engine control unit 4 executes rotational speed synchronization control in conjunction with calculating the target engine torque tTe. In the illustrated embodiment, the target engine rotational speed of the engine used during the rotational speed synchronization control is changed depending on whether or not it is desirable for a feeling of deceleration to be increased by executing engine braking.

Figure 5:
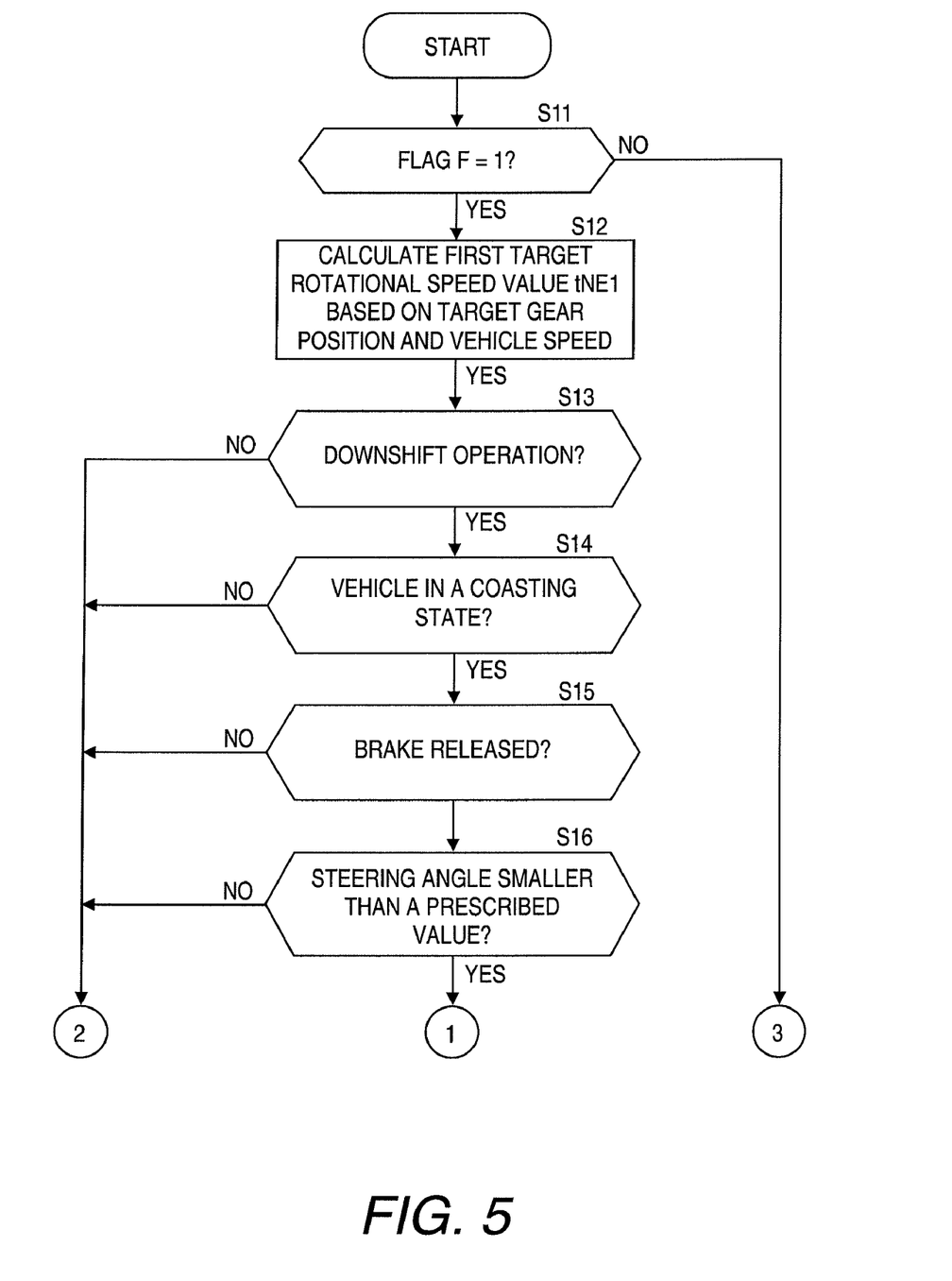
FIG. 5 is a flowchart showing a first part of a main rotational speed synchronization control routine.
Figure 6:
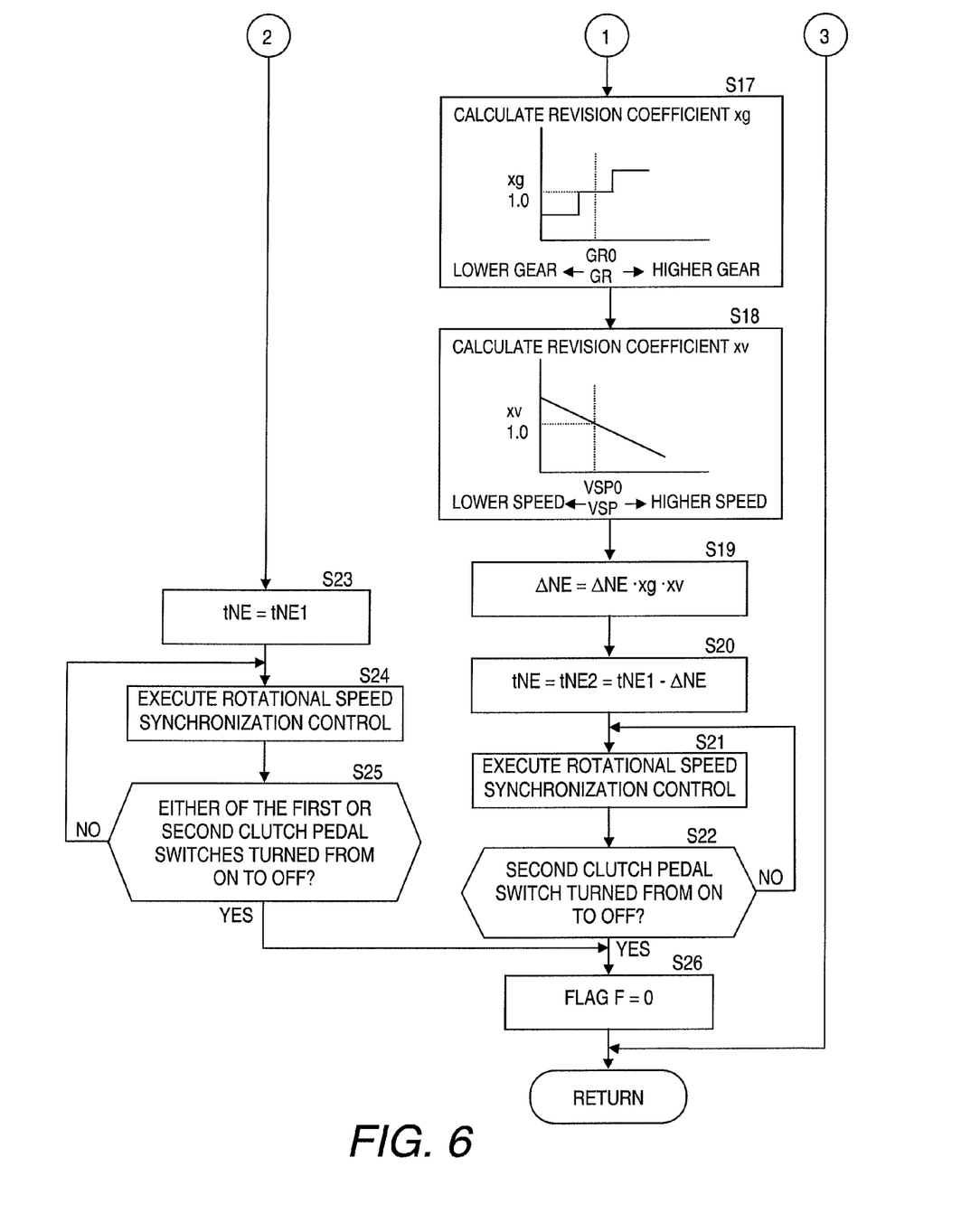
FIG. 6 is a flowchart showing a second part of a main rotational speed synchronization control routine.

The rotational speed synchronization control executed by the engine control unit 4 will now be explained with reference to the flowcharts shown in FIGS. 4 to 6.

Figure 4:
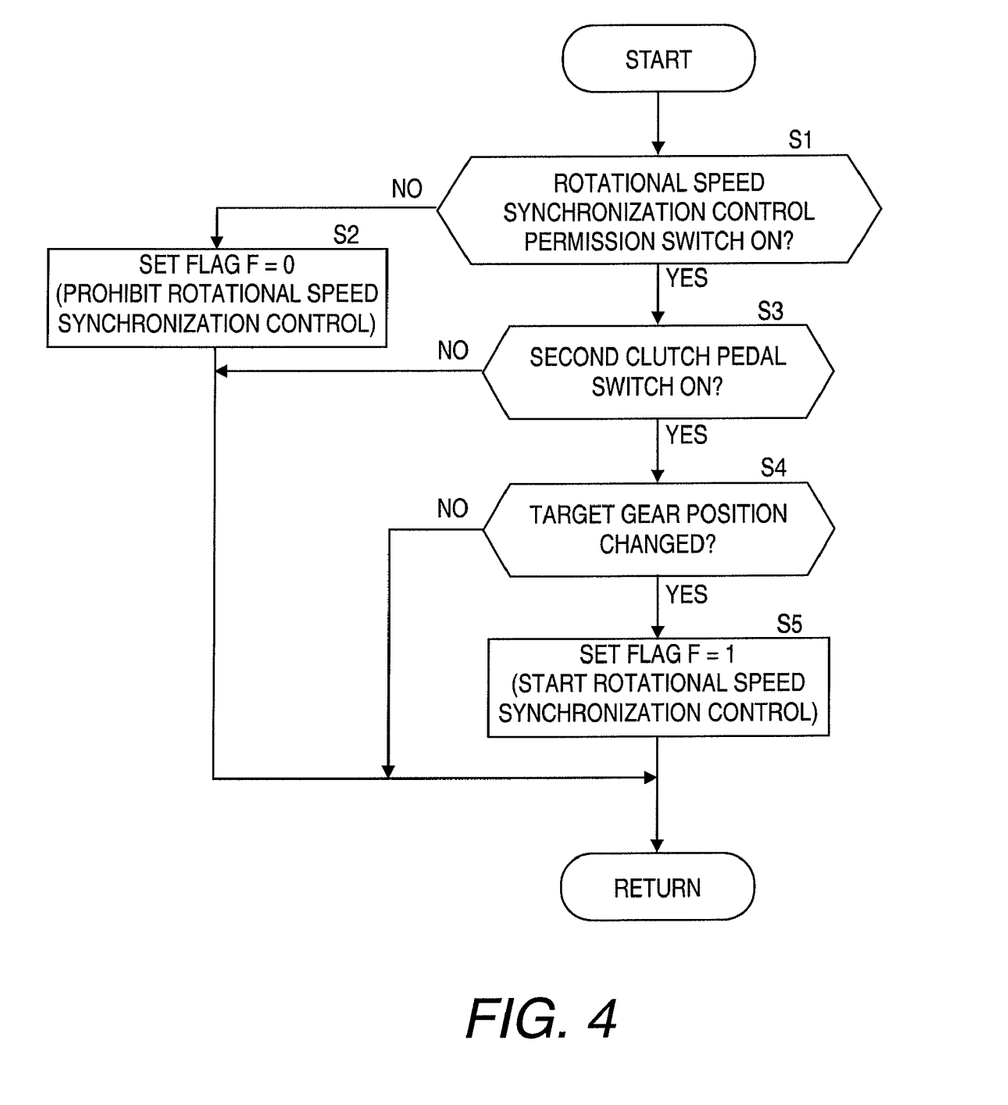
FIG. 4 is a flowchart showing a control routine for setting a rotational speed synchronization control flag.

FIG. 4 is a flowchart of a control routine for setting a rotational speed synchronization control flag. This routine is executed once per prescribed amount of time.

In step S1, the engine control unit 4 determines if the rotational speed synchronization control permission switch 17 is ON or OFF. If the switch 17 is OFF, then the engine control unit 4 proceeds to step S2 and sets the rotational speed synchronization control flag F to 0 (F=0), thereby prohibiting the rotational speed synchronization control.

If the rotational speed synchronization control permission switch 17 is ON, then the engine control unit 4 proceeds to step S3.

In step S3, the engine control unit 4 determines if the second clutch pedal switch 14B is ON or OFF. If the second clutch pedal switch 14B is OFF, then the engine control unit 4 ends the routine.

In step S4, the engine control unit 4 determines if the target gear position has changed based on the signals from the shift and stroke position sensors 15A and 15B. For example, if the transmission 6 is shifted from third gear to second gear as shown in FIG. 3, then the engine control unit 4 determines that the target gear position has changed from third gear to second gear (the target gear position that will be in effect after shifting is second gear) when the signals from the shift position sensors indicate that the shift lever has moved from the third gear position through the neutral state and reached the second gear determining position.

In order to ensure that the rotational speed synchronization control achieves an effect of alleviating shift shock, it is necessary to estimate the target gear position as quickly as possible and start the rotational speed synchronization control early such that the engine rotational speed is made to converge to a target engine rotational speed that will be described later. Therefore, the gear determining position is set to an intermediate position along the selection direction. As shown in FIG. 3, the second gear determining position and the third gear determining position (as well as other gear determining positions) are located inside the neutral region instead of near the final positions X2 and Y2 of the shift lever 7.

Consequently, in this example, when the transmission 6 is downshifted from third gear to second gear, the engine control unit 4 determines that the transmission 6 is in neutral when the shift lever 7 enters the neutral region from third gear and then determines that the target gear position is second gear when the shift lever 7 is moved to the left (left from the perspective of FIG. 3) and reaches the second gear determining position. As a result, the rotational speed synchronization control can be started earlier.

If a change of the target gear position is not detected, the engine control unit 4 ends the control routine.

If a change in the target gear position is detected, the engine control unit 4 proceeds to step S5. Here, with the post-shift target gear position identified, the engine control unit 4 sets the rotational speed synchronization control flag F to 1 (F=1) to start the rotational speed synchronization control.

The main routine of the rotational speed synchronization control will now be explained using the flowcharts of FIGS. 5 and 6. This routine, too, is executed once per prescribed amount of time.

In step S11, the engine control unit 4 determines if the value of the rotational speed synchronization control flag F is 1. If the rotational speed synchronization control flag F=1, then the ECU proceeds to step S12 and executes the rotational speed synchronization control. If the rotational speed synchronization control flag F=0, then the engine control unit 4 ends the control routine without executing rotational speed synchronization control.

In step S12, the engine control unit 4 calculates a target rotational speed of the engine for the rotational speed synchronization control based on the post-shift target gear position (gear ratio GR) and the current vehicle speed (transmission output shaft rotational speed) VSP. More specifically, the engine control unit 4 calculates a first target rotational speed value tNE1 (=VSP/GR), which is a rotational speed required for the vehicle to travel in the post-shift target gear position, i.e., for engine speed to be balanced with respect to the vehicle speed and the shift shock to be suppressed as much as possible (e.g., =input side transmission rotational speed computation value).

In steps S13 to S16, the engine control unit 4 makes a series of determinations to ascertain if the driver is downshifting with an intention to decelerate (i.e., a driver's deceleration intention). Thus, steps S13 to S16 constitute one example of a driving intent determining component configured to determine a driver's driving intention for the illustrated embodiment. If so, the engine control unit 4 will change to a second target rotational speed value tNE2 that is smaller than the first target rotational speed value tNE1 in order to increase the feeling of deceleration.

In step S13, the engine control unit 4 determines if the change in the target gear position resulted from a downshift operation.

In step S14, the engine control unit 4 determines if the vehicle was in a coasting state (not a driven state) before the downshift operation was performed. More specifically, the engine control unit 4 determines that the vehicle was in a driven state and the driver does not intend to decelerate if the accelerator pedal 9 was depressed until immediately before a clutch operation. Meanwhile, the engine control unit 4 determines that the vehicle was in a coasting state and the driver does intend to decelerate if the accelerator pedal 9 was in a released state prior to the clutch operation. For example, if the accelerator depression amount is zero at a point in time occurring a prescribed amount of time prior to the clutch operation (e.g., 1 second prior), then it can be determined that the vehicle was coasting.

In step S15, the engine control unit 4 determines if the brake pedal 8 is being depressed based on a detection value from the brake pedal sensor 19.

In step S16, the engine control unit 4 determines if the steering angle is equal to or larger than a prescribed value based on a detection value from the steering angle sensor 20.

If the conditions checked in steps S13 to S16 are all satisfied (i.e., if the determination results are all Yes), then the engine control unit 4 determines that the vehicle is coasting and the driver is downshifting with the intent to decelerate while not operating the brake and not steering beyond a prescribed steering angle. In such a case, the engine control unit 4 proceeds to step S17 and subsequent steps, where it changes the target engine rotational speed of the engine to a second target rotational speed value tNE2 that is smaller than the first target rotational speed value tNE1 in order to increase the feeling of deceleration.

Although in this embodiment the engine control unit 4 proceeds to step S17 when all of the conditions checked in steps S13 to S16 are satisfied, it is acceptable to, for example, omit step S16 (i.e., omit the steering angle requirement) and check only the conditions of steps S13 to S15. In such a case, the engine control unit 4 would proceed to step S17 when steps S13 to S15 are satisfied.

Furthermore, it is also acceptable to use only steps S13 and S14 to check for deceleration and have the engine control unit 4 proceed to step S17 when step S14 is satisfied.

The second target rotational speed value tNE2 is calculated using a difference $\Delta NE$ with respect to the first target rotational speed value tNE1. The difference $\Delta NE$ is calculated based on the post-shift target gear position and the vehicle speed VSP, and the second target rotational speed value tNE2 is calculated by subtracting the difference $\Delta NE$ from the first target rotational speed value tNE1. The rotational speed difference $\Delta NE$ is set to such a value that the feeling of deceleration is increased without causing the driver to feel a physical shock. The method of setting the difference $\Delta NE$ will now be explained.

The engine control unit 4 calculates a revision coefficient xg corresponding to the target gear position GR in step S17, calculates a revision coefficient xv corresponding to the vehicle speed VSP in step S18, and calculates the difference $\Delta NE$ by multiplying a base difference $\Delta NE0$ by the revision coefficients xg and xv, as shown in the equation below.

$$\Delta NE = \Delta NE0 \times xg \times xv$$

The base difference $\Delta NE0$ is set to a difference value that is appropriate for a prescribed target gear position GR0 and a prescribed vehicle speed VSP0. The revision coefficient xg is set to be smaller than 1 when the target gear position GR is lower (gear ratio is smaller) than the prescribed value GR0 and larger than 1 when the target gear ratio GR is higher (gear ratio is larger) than the prescribed value GR0. The revision coefficient xv is set to be smaller than 1 when the vehicle speed is higher than the prescribed value VSP0 and larger than 1 when the vehicle speed is lower than the prescribed value VSP0. In other words, the lower the target gear position is and the higher the vehicle speed is, the more likely it is that the shift shock will be large and, thus, the difference $\Delta NE$ is set to a smaller value. Conversely, the higher the target gear position is and the lower the vehicle speed is, the less likely it is that the shift shock will be large and, thus, the difference $\Delta NE$ is set to a larger value to strengthen the feeling of deceleration.

It is also acceptable to calculate the difference $\Delta NE$ in a simpler fashion based on only one or the other of the target gear position and the vehicle speed. For example, the difference $\Delta NE$ can be set to a smaller value when the target gear position is lower or when the vehicle speed is higher.

In step S20, the engine control unit 4 calculates the second target rotational speed value tNE2 using the equation shown below and sets the result as the final target rotational speed tNE.

$$tNE2 = tNE1 - \Delta NE$$

In step S21, the engine control unit 4 starts the rotational speed synchronization control using the calculated second target rotational speed value tNE2.

After starting the rotational speed synchronization control, the engine control unit 4 proceeds to step S22 and determines if the second clutch pedal switch 14B as turned from ON to OFF. If so, the engine control unit 4 proceeds to step S26 and sets the rotational speed synchronization control flag F to 0. As a result, the rotational speed synchronization control is ended in step S11 of the next control cycle.

Meanwhile, if any of the conditions checked in steps S13 to S16 is not satisfied, then the engine control unit 4 proceeds to step S23 and sets the first target rotational speed value tNE1 calculated in step S12 as the final target rotational speed tNE of the engine 1. Thus, when the driver is upshifting, the vehicle is in a driven state before downshifting, or the driver is otherwise not intending to decelerate, it is not necessary to impart a feeling of deceleration and the first target rotational speed value tNE1 is selected as the target engine rotational speed tNE. As a result, the shift shock can be greatly suppressed and acceleration can be resumed with good response.

Additionally, even when the vehicle is in a coasting state, the first target rotational speed value tNE1 is selected if a sufficient deceleration rate is being obtained due to operation of the brake such that a better vehicle behavior will be obtained by not further increasing the deceleration rate.

Similarly, even when the vehicle is in a coasting state, the first target rotational speed value tNE1 is selected if the downshifting is occurring while the vehicle is coming with a steering angle equal to or larger than a prescribed angle such that a better vehicle behavior will be obtained by not further increasing the deceleration rate.

In cases in which the first target rotational speed value tNE1 is selected, the engine control unit 4 proceeds to step S24 and starts the rotational speed synchronization control. Then, in step S25 the engine control unit 4 determines if the first clutch pedal switch 14A or the second clutch pedal switch 14B has turned from ON to OFF. If so, then the engine control unit 4 proceeds to step S26 and sets the rotational speed synchronization control flag F to 0 to end the rotational speed synchronization control.

More specifically, a situation in which it is not necessary to strengthen the feeling of deceleration could be a situation in which it is necessary to stop the rotational speed synchronization control and resume acceleration immediately after the shift operation is completed. Therefore, if the clutch pedal 5A was depressed deeply and the first clutch pedal switch 14A was turned ON, then the engine control unit 4 ends the rotational speed synchronization control when the first clutch pedal switch 14A turns OFF.

It is also acceptable to contrive the apparatus such that even when it is not necessary to strengthen the feeling of deceleration, priority is given to continuing the rotational speed synchronization control until the clutch 5 is finished connecting. More specifically, if it is desirable to give priority to keeping the shift shock as small as possible, then the rotational speed synchronization control can be continued until the second clutch pedal switch 14B turns OFF.

Figure 7:
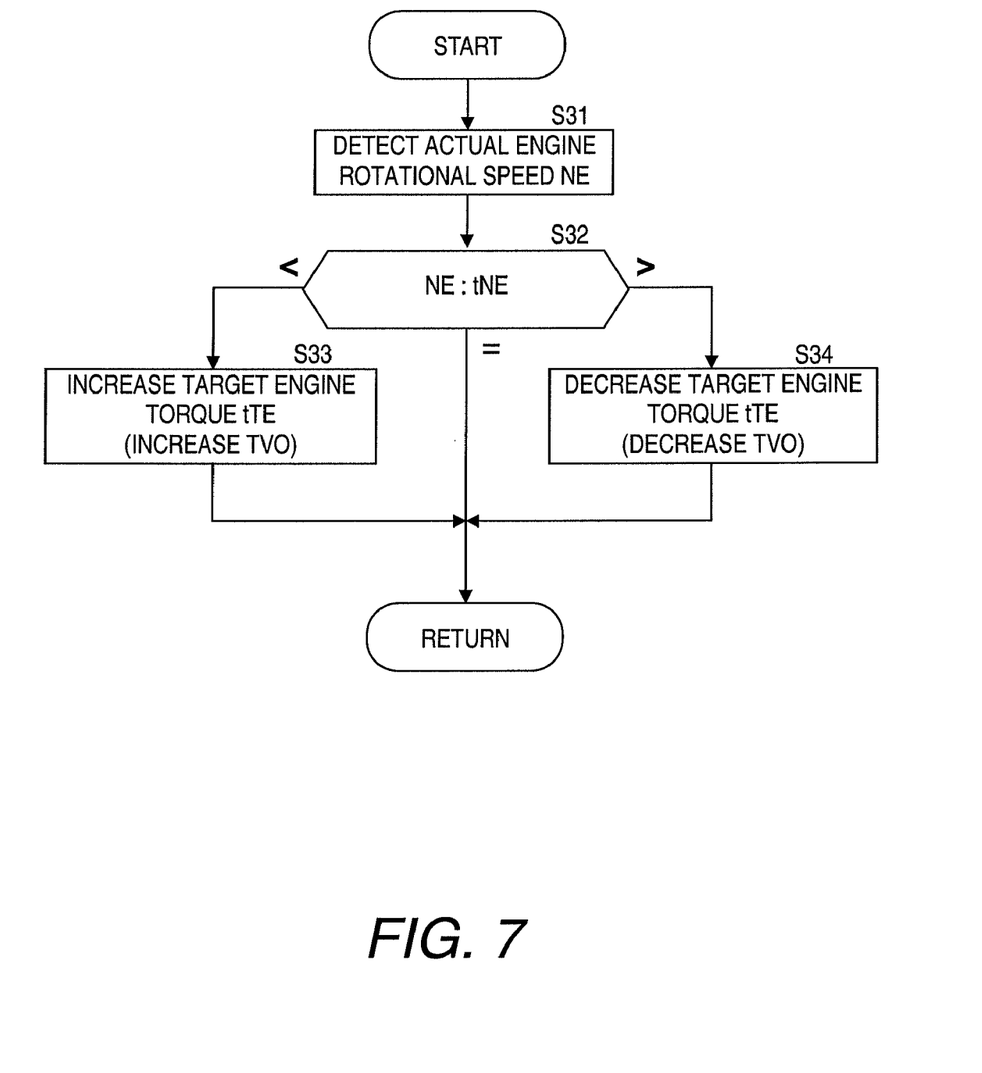
FIG. 7 is a flowchart of a subroutine of the rotational speed synchronization control.

FIG. 7 shows a subroutine detailing the rotational speed synchronization control executed in steps S21 and S24.

In step S31, the engine control unit 4 detects the actual engine rotational speed NE.

In step S32, the engine control unit 4 compares the actual engine rotational speed NE to the target engine rotational speed tNE.

If the actual engine rotational speed NE is smaller than the target engine rotational speed tNE (NE<tNE), then the engine control unit 4 proceeds to step S33 and increases the throttle valve opening degree TVO by increasing the target engine torque tTE. As a result, the engine rotational speed NE increases toward the target engine rotational speed tNE.

If the actual engine rotational speed NE is larger than the target engine rotational speed tNE (NE<tNE), then the engine control unit 4 proceeds to step S34 and decreases the throttle valve opening degree TVO by decreasing the target engine torque tTE. As a result, the engine rotational speed NE decreases toward the target engine rotational speed tNE.

Figure 8:
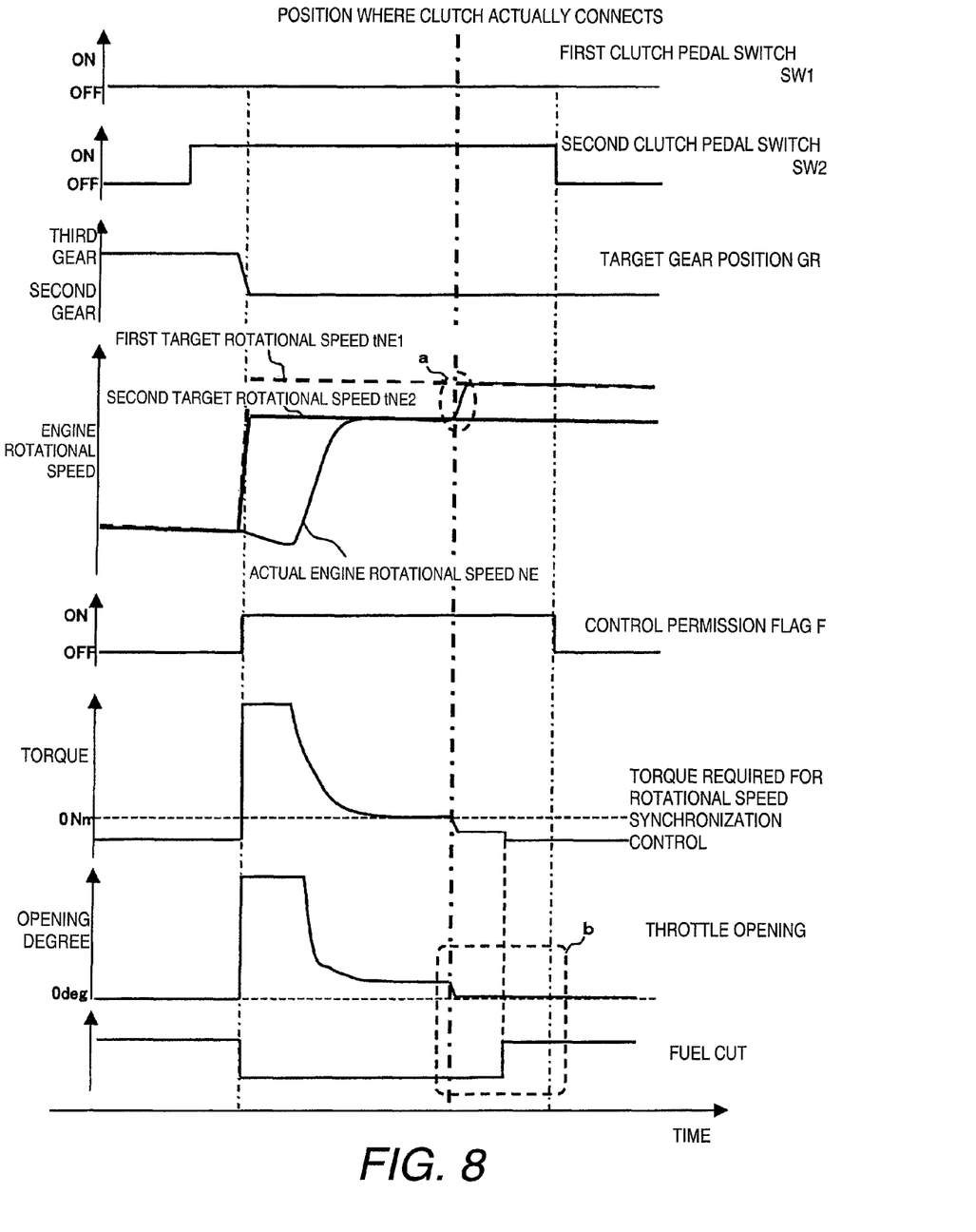
FIG. 8 is a time chart illustrating changes that occur in various quantities during an example of a control in accordance with the illustrated embodiment.

FIG. 8 illustrates the control executed when the driver downshifts from third gear to second gear while intending to decelerate. In this example, it is assumed that the driver does not perform a brake operation before downshifting and the steering angle is smaller than a prescribed angle.

The driver depresses the clutch pedal and the second clutch pedal switch 14B turns from OFF to ON. Then, when the driver has changed the target gear position from third gear to second gear by performing a shift operation, the rotational speed synchronization control is started using the second target rotational speed value tNE2.

After the actual engine rotational speed NE has reached the second target rotational speed value tNE2 due to the rotational speed synchronization control, the clutch pedal 5A is operated in the release direction and the clutch 5 connects, causing the engine rotational speed NE to increase to the transmission input shaft rotational speed, i.e., the first target rotational speed value tNE1. An engine braking force is generated when the actual rotational speed NE is raised to tNE1 (see section "a" of FIG. 8).

After the clutch 5 connects, there is a period in which the second clutch pedal switch 14B is still ON. During this period, the rotational speed synchronization control continues based on the second target rotational speed value tNE2. Since the actual engine rotational speed NE is at the rotational speed value tNE1, which is larger than the second target rotational speed value tNE2, the throttle valve is closed completely such that a negative torque is produced and the fuel supply is cut in order to reduce the rotational speed NE. As a result, an engine braking force continues to be produced (see section "b" of FIG. 8).

After the second clutch pedal switch 14B turns OFF, the rotational speed synchronization control ends. If the driver has released the accelerator pedal 9 so as to continue coasting, the accelerator position will be 0 and, thus, the throttle valve will be fully closed. As a result, an engine braking force will continue to be produced.

Thus, in a situation where the driver intends to decelerate, an engine braking force can be produced and the feeling of deceleration can be increased even if rotational speed synchronization control is executed when the clutch 5 connects and after the clutch connects. In a situation where the driver does not intend to decelerate or a situation in which the driver does intend to decelerate but is operating the brake or turning the steering to a steering angle equal to or larger than a prescribed angle, it is preferable not to induce an engine braking force. In such situations, the shift shock can be suppressed to the greatest degree possible and good vehicle behavior can be maintained by using the normal target rotational speed.

In this embodiment, the turning from OFF to ON of the second clutch pedal switch 14B is used as a condition for executing the rotational speed synchronization control. Since the second clutch pedal switch 14B is configured to turn ON before the clutch 5 actually disconnects, the actual rotational speed of the engine 1 can be reliably held at the second target rotational speed value tNE2 before the clutch 5 connects and an engine braking force can be obtained when the clutch 5 connects. Furthermore, even if the driver does not intend to decelerate, the rotational speed synchronization control can be started earlier and the engine rotational speed can be held to the target engine rotational speed before the clutch connects, thus enabling the shift shock to be suppressed to the greatest degree possible. It is also acceptable to simply provide a clutch pedal switch that turns ON before the clutch disconnects and to end two rotational speed synchronization controls having different target rotational speeds when the clutch pedal switch turns OFF.

The illustrated embodiment can also be applied to an engine control apparatus contrived such that the rotational speed synchronization control is started when a clutch switch contrived to turn ON after the clutch disconnects turns ON. In such an apparatus, when it is desirable to increase the feeling of deceleration, the target engine rotational speed is decreased during the rotational speed synchronization control executed before the clutch connects. As a result, an engine braking force is obtained when the clutch connects and the engine rotational speed is raised.

By using a combination of a switch that turns ON before the clutch disconnects and a switch that turns ON after the clutch disconnects, as is done in the illustrated embodiment, a control that increases the feeling of deceleration can be executed while also executing a control that serves to end the rotational speed synchronization control early and increase the acceleration resumption response when the driver does not intend to decelerate. In such a case, it is acceptable to adopt a control scheme in which the turning ON of a switch (first clutch pedal switch 14A) contrived to turn ON after the clutch disconnects is used as a condition for executing the rotational speed synchronization control when the rotational speed synchronization control is executed using the first target rotational speed, i.e., when the driver does not intend to decelerate or when, even if the driver does intend to decelerate, it is desirable not to induce engine braking.

When two clutch switches are used as is done in the embodiment, a failure diagnosis can be executed with respect to each of the switches and the signal of one of the clutch switches can be used if the other clutch switch has failed.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle engine control apparatus comprising:
a shift operation detecting component configured to detect a shift position resulting from a manual shift operation of a manual transmission connected to an engine;
a vehicle speed detecting component configured to detect a vehicle speed;
a transmission input side rotational speed computing component configured to compute an input side transmission rotational speed value based on the vehicle speed detected by the vehicle speed detecting component and a gear ratio determined based on the shift position detected by the shift operation detecting component;
a driving intent determining component configured to determine a driver's driving intention; and
a rotational speed synchronization control component configured to perform rotational speed synchronization control by controlling an engine rotational speed towards a target engine rotational speed based on a first target engine rotational speed value that is equal to the input side transmission rotational speed value when a clutch is disconnected with the driving intent determining component having not determined that the driver's driving intention indicates a deceleration intention, and based on a second target engine rotational speed value that is smaller than the input side transmission rotational speed value when the clutch is disconnected with the driving intent determining component determining that the driver's driving intention indicates the deceleration intention.

2. The vehicle engine control apparatus as recited in claim 1, wherein
the driving intent determining component is further configured to determine the driver's driving intention based on a driver's accelerator operation performed before the manual shift operation.

3. The vehicle engine control apparatus as recited in claim 1, wherein
the driving intent determining component is further configured to determine the deceleration intention exists if a vehicle coasting state existed before a manual downshift operation has occurred as determined by the shift operation detecting component, and to determine the deceleration intention does not exists if a vehicle driven state existed before the manual downshift operation has occurred.

4. The vehicle engine control apparatus as recited in claim 1, wherein
the rotational speed synchronization control component is further configured such that a difference between the first target engine rotational speed value and the second target engine rotational speed value is changed depending on the gear ratio resulting after a manual downshift operation has occurred.

5. The vehicle engine control apparatus as recited in claim 1, wherein
the rotational speed synchronization control component is further configured such that a difference between the first target engine rotational speed value and the second target engine rotational speed value is changed depending on the vehicle speed occurring after a manual downshift operation has occurred.

6. The vehicle engine control apparatus as recited in claim 1, wherein
the rotational speed synchronization control component is further configured to execute the rotational speed synchronization control in response to a clutch sensor detecting the clutch being fully released from a connected state by an increase operation amount of the clutch to a release state.

7. The vehicle engine control apparatus as recited in claim 1, wherein
the rotational speed synchronization control component is further configured to end the rotational speed synchronization control in response to operation of at least one of a first clutch switch that turns from OFF to ON after the clutch is fully released from a connected state by an increase in an operation amount of the clutch and a second clutch switch that turns from OFF to ON before the clutch is released from the connected state by an increase in an operation amount of the clutch, such that the rotational speed synchronization control based on the first target engine rotational speed value ends in response to either a first clutch switch or a second clutch switch being turned from ON to OFF, and the rotational speed synchronization control based on the second target engine rotational speed value ends in response to the second clutch switch being turned from ON to OFF.

8. A vehicle engine control apparatus comprising:
a shift operation detecting component configured to detect a shift position resulting from a manual shift operation of a manual transmission connected to an engine;
a vehicle speed detecting component configured to detect a vehicle speed;
a transmission input side rotational speed computing component configured to compute an input side transmission rotational speed value based on the vehicle speed detected by the vehicle speed detecting component and a gear ratio determined based on the shift position detected by the shift operation detecting component;

a driving intent determining component configured to determine a driver's driving intention; and a rotational speed synchronization control component configured to perform rotational speed synchronization control by controlling an engine rotational speed towards a target engine rotational speed based on a driving intent determination of the driving intent determining component and the input side transmission rotational speed value of the transmission input side rotational speed computing component while the clutch is disconnected, with a first target engine rotational speed value being set when the driving intent determining component has not determined that the driver's driving intention indicates a deceleration intention and a second target engine rotational speed value being set when the driving intent determining component determines the driver's driving intention indicates a deceleration intention, the second target engine rotational speed value being smaller than the first target engine rotational speed value.

9. The vehicle engine control apparatus as recited in claim 8, wherein the driving intent determining component is further configured to determine the driver's driving intention based on a driver's accelerator operation performed before the manual shift operation.

10. The vehicle engine control apparatus as recited in claim 8, wherein the driving intent determining component is further configured to determine the deceleration intention exists if a vehicle coasting state existed before a downshift operation has occurred as determined by the shift operation detecting component.

11. The vehicle engine control apparatus as recited in claim 8, further comprising a brake operation detecting component configured to detect a manual brake operation, with the rotational speed synchronization control component being further configured to set the target engine rotational speed to the first target engine rotational speed value when the driving intent determining component determines that the vehicle was in a coasting state before a manual downshift operation has occurred as determined by the shift operation detecting component and the brake operation detecting component detects that the manual brake operation is being performed.

12. The vehicle engine control apparatus as recited in claim 8, further comprising a steering angle detecting component configured to detect a steering angle of the vehicle, with the rotational speed synchronization control component being further configured to set the target engine rotational speed to the first target engine rotational speed value when the driving intent determining component has determined that the vehicle was in a coasting state before a manual downshift operation and the steering angle detecting component detects a steering angle that is equal to or larger than a prescribed value.

13. The vehicle engine control apparatus as recited in claim 8, wherein the rotational speed synchronization control component is further configured such that a difference between the first target engine rotational speed value and the second target engine rotational speed value is set based on at least one of a post downshift target gear position and a post downshift vehicle speed.

14. A vehicle engine control method comprising:

detecting a shift position of a manual transmission connected to an engine;

detecting a vehicle speed;

computing an input side transmission rotational speed value based on the vehicle speed that was detected and a gear ratio that was determined based on the shift position that was detected;

determining a driver's driving intention; and performing rotational speed synchronization control by controlling an engine rotational speed towards a target engine rotational speed based on a first target engine rotational speed value that is equal to the input side transmission rotational speed value when a clutch is disconnected with the driver's driving intention not indicating a deceleration intention, and based on a second target engine rotational speed value that is smaller than the input side transmission rotational speed value when the clutch is disconnected with the driver's driving intention indicating a deceleration intention.

15. The vehicle engine control method as recited in claim 14, wherein the determining of the driver's driving intention determines that the deceleration intention exists if a vehicle coasting state existed before a manual downshift operation has occurred, and determine that the deceleration intention does not exists if a vehicle driven state existed before the manual downshift operation has occurred.

16. The vehicle engine control method as recited in claim 14, wherein the performing of the rotational speed synchronization control is performed such that a difference between the first target engine rotational speed value and the second target engine rotational speed value is changed depending on the gear ratio resulting after a manual downshift operation has occurred.

17. The vehicle engine control method as recited in claim 14, wherein the performing of the rotational speed synchronization control is performed such that a difference between the first target engine rotational speed value and the second target engine rotational speed value is changed depending on the vehicle speed occurring after a manual downshift operation has occurred.

* * * * *